United States Patent
Park et al.

(10) Patent No.: US 8,797,945 B2
(45) Date of Patent: Aug. 5, 2014

(54) SYSTEM AND METHOD FOR HYBRID SCHEMES OF MIMO MODE DECISION

(75) Inventors: Sungki Park, Ashburn, VA (US); Masoud Olfat, Great Falls, VA (US); Dhaval Dipak Mehta, Herndon, VA (US)

(73) Assignee: Clearwire IP Holdings LLC, Bellevue, WA (US)

(*) Notice: Subject to any disclaimer, the term of this patent is extended or adjusted under 35 U.S.C. 154(b) by 908 days.

(21) Appl. No.: 12/434,029

(22) Filed: May 1, 2009

(65) Prior Publication Data

US 2010/0278160 A1    Nov. 4, 2010

(51) Int. Cl.
*H04W 4/00* (2009.01)

(52) U.S. Cl.
USPC .......................................... 370/328

(58) Field of Classification Search
USPC ................ 370/310, 328, 329; 455/450, 452.2
See application file for complete search history.

(56) References Cited

U.S. PATENT DOCUMENTS

| | | | |
|---|---|---|---|
| 6,035,183 A | 3/2000 | Todd et al. | 455/226.2 |
| 6,404,826 B1 | 6/2002 | Schmidl et al. | 375/340 |
| 7,764,744 B2* | 7/2010 | Choi et al. | 375/267 |
| 8,233,434 B2 | 7/2012 | Park et al. | 370/328 |
| 8,312,337 B2 | 11/2012 | Park et al. | 714/748 |
| 8,509,156 B2 | 8/2013 | Park et al. | 370/328 |
| 2002/0012343 A1 | 1/2002 | Holloway et al. | 370/389 |
| 2002/0041570 A1 | 4/2002 | Ptasinski et al. | 370/252 |
| 2003/0036385 A1 | 2/2003 | Uehara et al. | 455/437 |
| 2004/0218545 A1 | 11/2004 | Pedersen | 370/252 |
| 2004/0259555 A1 | 12/2004 | Rappaport et al. | |
| 2005/0227697 A1 | 10/2005 | Borst et al. | 455/450 |
| 2006/0057965 A1 | 3/2006 | Braun et al. | 455/67.11 |
| 2006/0193373 A1 | 8/2006 | Agee et al. | 375/141 |
| 2007/0115874 A1 | 5/2007 | Usuda et al. | 370/328 |
| 2007/0183380 A1 | 8/2007 | Rensburg et al. | |
| 2007/0211813 A1 | 9/2007 | Talwar et al. | 375/267 |

(Continued)

FOREIGN PATENT DOCUMENTS

| | | |
|---|---|---|
| JP | H07-212299 | 8/1995 |
| JP | 2005-244991 | 9/2005 |

(Continued)

OTHER PUBLICATIONS

Japanese Application No. 2009-275381, Request for Accelerated Examination filed Mar. 15, 2010, with English translation, 5 pages.

(Continued)

*Primary Examiner* — Dang Ton
*Assistant Examiner* — Kevin Lee

(57) ABSTRACT

A system and method a hybrid scheme of mode decision in a network having a plurality of mobile stations communicably coupled to a base station may include a mode decision module associated with the base station. The mode decision module may include one or more processors configured to select a first mode configuration for use during transmission of a first communication from the base station, receive first feedback information comprising a first mode recommendation and first channel information, identify a first system state of the first communication based at least in part on the first condition information, determine whether to use the first mode recommendation configuration based at least in part on the first system state, and configure the second communication using a second mode configuration based on the determination.

27 Claims, 5 Drawing Sheets

(56) References Cited

U.S. PATENT DOCUMENTS

| | | | |
|---|---|---|---|
| 2007/0232359 A1 | 10/2007 | Pinheiro et al. | 455/562.1 |
| 2007/0254597 A1 | 11/2007 | Li et al. | 455/69 |
| 2008/0014915 A1 | 1/2008 | Usuda et al. | 455/422.1 |
| 2008/0025422 A1 | 1/2008 | Bitran et al. | |
| 2008/0059859 A1 | 3/2008 | Marinier et al. | |
| 2008/0132173 A1 | 6/2008 | Sung et al. | 455/67.13 |
| 2008/0144626 A1 | 6/2008 | Bertinelli et al. | |
| 2008/0220788 A1 | 9/2008 | Stanwood et al. | |
| 2008/0253342 A1 | 10/2008 | So et al. | |
| 2008/0273610 A1 | 11/2008 | Malladi et al. | |
| 2008/0310338 A1 | 12/2008 | Charpenter et al. | |
| 2008/0310395 A1 | 12/2008 | Kashima | |
| 2008/0317014 A1 | 12/2008 | Veselinovic et al. | 370/380 |
| 2008/0320354 A1 | 12/2008 | Doppler et al. | |
| 2009/0003257 A1 | 1/2009 | Kumar et al. | |
| 2009/0022254 A1 | 1/2009 | Na et al. | |
| 2009/0034526 A1 | 2/2009 | Ahmadi et al. | |
| 2009/0040993 A1 | 2/2009 | Kim et al. | |
| 2009/0052390 A1 | 2/2009 | Gu et al. | |
| 2009/0059801 A1 | 3/2009 | Garrett et al. | |
| 2009/0059857 A1 | 3/2009 | Kim et al. | |
| 2009/0080374 A1 | 3/2009 | Lee et al. | |
| 2009/0083431 A1 | 3/2009 | Balachandran et al. | 709/228 |
| 2009/0086657 A1 | 4/2009 | Alpert et al. | |
| 2009/0086704 A1 | 4/2009 | Ho | |
| 2009/0086855 A1 | 4/2009 | Jin et al. | 375/341 |
| 2009/0092099 A1 | 4/2009 | Gu et al. | |
| 2009/0131066 A1 | 5/2009 | Barve et al. | |
| 2009/0219852 A1 | 9/2009 | Youn et al. | |
| 2009/0300453 A1 | 12/2009 | Sahara | |
| 2009/0310550 A1 | 12/2009 | Medapalli et al. | |
| 2010/0014473 A1 | 1/2010 | Ofuji et al. | 370/329 |
| 2010/0042876 A1 | 2/2010 | Yue et al. | 714/704 |
| 2010/0278103 A1 | 11/2010 | Park et al. | 370/328 |
| 2010/0281322 A1 | 11/2010 | Park et al. | 714/748 |
| 2011/0276852 A1 | 11/2011 | Mueller-Weinfurtner et al. | |
| 2011/0305213 A1 | 12/2011 | Lohr et al. | |
| 2012/0275388 A1 | 11/2012 | Park et al. | 370/328 |
| 2013/0070629 A1 | 3/2013 | Park et al. | 370/252 |

FOREIGN PATENT DOCUMENTS

| | | |
|---|---|---|
| JP | 2005-531247 | 10/2005 |
| JP | 2009-021787 | 1/2009 |
| WO | WO 2004/004173 | 1/2004 |
| WO | WO 2008/044529 | 4/2008 |

OTHER PUBLICATIONS

Japanese Application No. 2009-275381, Japanese Office Action mailed May 14, 2010 with English translation, 6 pages.
Japanese Application No. 2009-275381, Office Action mailed Nov. 22, 2010 with English translation, 4 pages.
International Patent Application No. PCT/US2010/032981, International Search Report and Written Opinion mailed Jul. 2, 2010, 13 pages.
International Patent Application No. PCT/US2010/032986, International Search Report and Written Opinion mailed Jul. 2, 2010, 10 pages.

* cited by examiner

SYSTEM AND METHOD FOR HYBRID SCHEMES OF MIMO MODE DECISION

CROSS-REFERENCE TO RELATED APPLICATIONS

This Application is related to co-pending U.S. patent application Ser. No. 12/434,047 entitled "System and Method for Adaptive Control of an Averaging Parameter for PCINR and RSSI" and co-pending U.S. patent application Ser. No. 12/434,063 entitled "System and Method for Dynamic Hybrid Automatic Repeat Request (HARQ) Enable/Disable," both of which are concurrently filed herewith and both of which are hereby incorporated by reference herein in their entirety.

BACKGROUND

This disclosure related to a system and method for implementing hybrid schemes of mode decision by a Base Station in a Wireless Metropolitan Area Network (WMAN) described in the IEEE 802.16 specification.

In a WMAN communications network, a base station (BS) may communicate with a mobile station (MS) on a communication channel. Various factors such as the existence of ambient interference around the MS or BS, movement of the MS, system level information of the BS, and/or other factors may degrade or otherwise alter the condition of the communication channel. As such, various channel information may be used to indicate the channel condition. For example, there exists a variety of channel information such as, for example, channel correlation (Corr), Rank, a Physical Carrier to Interference plus Noise Ratio (PCINR), a Received Signal Strength Indicator (RSSI), a Burst Error Rate (BuER) based on an ACK/NACK ratio that indicates a proportion of successful data transmissions to unsuccessful transmission (thereby indicating channel stability), PCINR Standard Deviation that may indicate Doppler and fading effects that result from movement of the MS, system loads, and/or other indicators.

In order to respond to changes to the communication channel, the BS may use different mode configurations. Mode configurations may include, among other things, a Multiple-Input-Multiple-Output (MIMO) mode selection, a Modulation Coding Scheme (MCS) level selection, and/or other mode configurations.

In existing systems, the BS generates a mode configuration that the BS has determined to be suitable. The BS-derived mode configuration may be used in these existing systems irrespective of the particular conditions of the communication channel and irrespective of information available to the MS that may be unavailable to the BS. In other existing system, the MS may generate a recommended mode configuration that the MS has determined to be suitable. In these existing systems, the MS-derived mode configuration may be used again irrespective of the particular conditions of the communication channel and irrespective of information available to the BS that may be unavailable to the MS.

Thus, by using either an exclusive BS-centric or exclusive MS-centric approach to mode decision, existing systems may not adequately make an appropriate mode decision because in some instances the BS may have more information applicable to the mode decision than the MS while in other instances the MS may have more information applicable to the mode decision than the BS.

These and other drawbacks exist.

SUMMARY

Various embodiments disclosed herein relate to a system and method for implementing hybrid schemes of mode decision by a Base Station (BS) in a Wireless Metropolitan Area Network (WMAN) described in the IEEE 802.16 specification. The BS may select an appropriate mode configuration such as, for example, Multiple Input Multiple Output (MIMO) Mode and/or Modulation Coding Scheme (MCS) based upon a system state. In particular, the BS may select between MIMO A or MIMO B and/or low MCS or high MCS. The system state may be characterized by state information such as, for example, channel information of a communication channel, and/or system level information that may indicate an ability of the system to process communications. As such, the system state may reflect current conditions that may affect communications between the BS and a mobile station (MS).

According to various embodiments, the system state may be identified by considering state information alone, such as, for example, a channel correlation (Corr) alone, or considering state information in combination with other state information, such as Corr, a Physical Carrier to Interference plus Noise Ratio (PCINR), and/or a Burst Error Rate (BuER). Corr may indicate path correlation between multiple receivers (such as multiple MSs) such that a higher Corr may indicate higher error rates of data transmission. PCINR may indicate a level of interference on the communication channel and BuER may indicate transmission error rates via ACK/NACK feedback. Other state information used alone and/or in combination are contemplated. For example, whether and how state information is to be considered alone or in combination with other state information when determining the system state may be configurable by a vendor (or other entity) implementing the system or method.

According to various embodiments of the disclosure, a system state may be associated with one or more transition conditions that may define when and how to transition the system state to another system state. For example, when a prior system state has been determined for a prior communication, the system and method may transition the prior system state to a current system state according to one or more transition conditions associated with, or otherwise defined for the prior system state. In other words, when a transition condition for the prior system state has been satisfied, the prior system state may be transitioned to the current system state according to the satisfied transition condition. In this manner, the system state may be transitioned based on current state information, thereby adaptively changing the system state as conditions change over time. As previously noted, the mode configuration may be based upon the system state. As such, by adaptively changing the system state, changes to the state information over time may be a factor when performing the mode decision.

The BS may perform mode decision (i.e., select a mode configuration) depending on the system state. The mode decision may include whether to use a mode recommendation by the MS communicably coupled to the BS on the communication channel. The MS may generate a mode recommendation based on channel information for which the MS has access such as, for example, Corr, Rank, PCINR, and/or PER.

Because the MS may have more channel information (such as, for example, Corr, Rank, FEC Block error rate) than the BS, the MS may more information relevant to the mode decision than the BS. However, because the MS does not have access to information such as, for example, system level information, for which the BS has access, the MS may not take into account such information. Thus, in certain situations (i.e., depending on the system state) the MS may make a better mode decision than the BS, and vice versa.

Accordingly, the present system and method may assess the system state in order to determine whether to use the mode recommendation from the MS or use a mode derived by the BS. By doing so, the system and method may take advantage of the benefits of using a MS-derived mode configuration and the benefits of using a BS-derived mode configuration by deciding between the mode configurations depending on the system state. As such, the BS may use a hybrid scheme of mode decision, using either an MS recommended mode configuration or a BS determined mode configuration. By using the hybrid scheme of mode decision, the system and method may adaptively respond to the system state with an appropriate mode configuration.

Various other features and characteristics of the system and method of this disclosure will be apparent through the detailed description of various embodiments and the drawings attached hereto. It is also to be understood that both the foregoing general description and the following detailed description are examples and not restrictive of the scope of the inventive concepts described herein.

DETAILED DESCRIPTION

According to various embodiments of this disclosure, a system and method may be used to implement hybrid schemes of mode decision by a Base Station (BS) in a Wireless Metropolitan Area Network (WMAN) described in the IEEE 802.16 specification. The BS may select an appropriate mode configuration such as, for example, MIMO Mode and/or Modulation Coding Scheme (MCS) based upon a system state. The system state may be characterized by factors such as, for example, channel information of a communication channel and/or system level information that may indicate an ability of the system to process communications. Channel information may include, among other things, Corr, Rank, PCINR, and/or BuER. System level information may include, among other things, system loan, sector throughput, slot availability, sector throughput, and/or other factors. As such, the system state may reflect current conditions that may affect communications between the BS and a mobile station (MS).

Thus, the BS may perform mode decision depending on the system state. The mode decision may include whether to use a mode recommendation by the MS communicably coupled to the BS on the communication channel. The MS may generate a mode recommendation based on channel information for which the MS has access such as, for example, Corr, PCINR, and/or PER. The MS may have more channel information than the BS and therefore may be better suited to select a mode configuration. However, because the MS does not have access to information such as, for example, system-level information, for which the BS has access, the MS may not take into account such information. Thus, in certain situations (i.e., depending on the system state) the MS may make a better decision than the BS, and vice versa. Accordingly, the system and method may assess the system state in order to determine whether to use the mode recommendation from the MS or use a mode configuration derived by the BS. By doing so, the system and method may be used to employ a hybrid scheme of mode decision, taking advantage of the benefits of using an MS-derived mode and the benefits of using a BS-derived mode depending on the system state.

Figure 1:
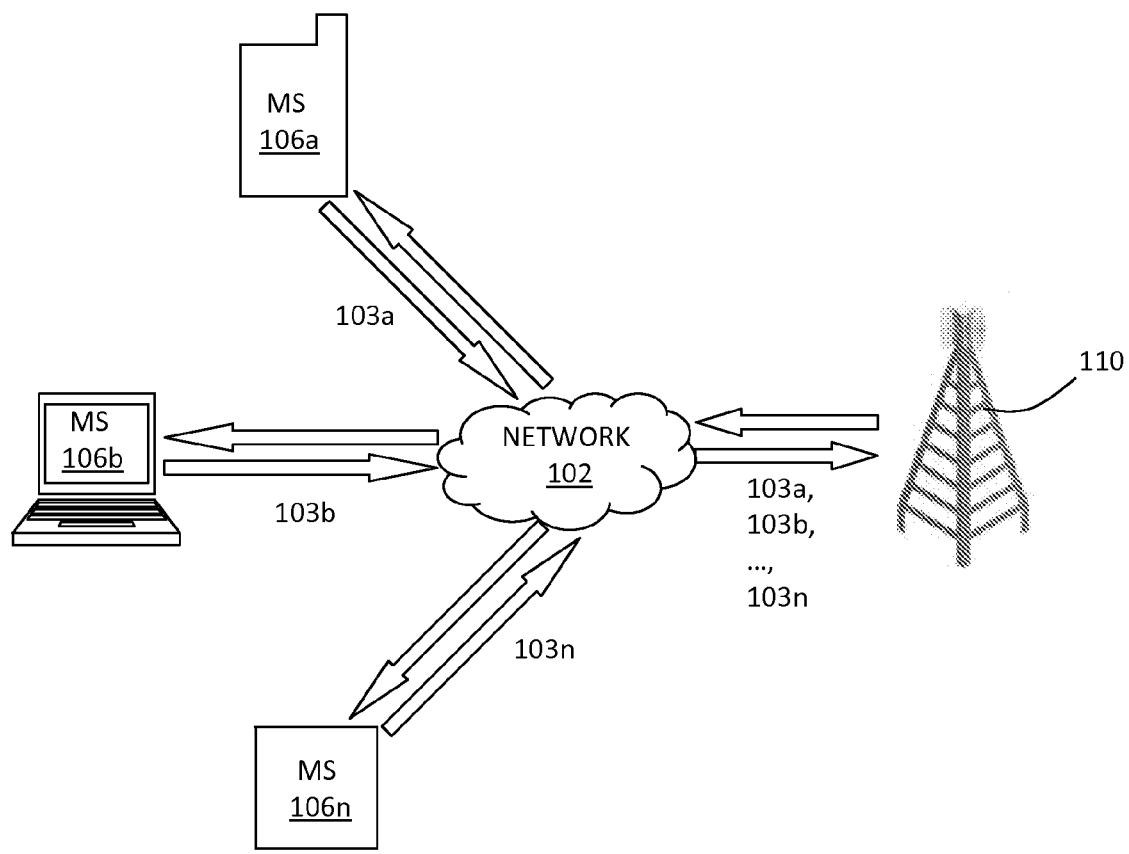
FIG. 1 is a block diagram that illustrates an example of a system for hybrid schemes of mode decision according to an embodiment of the disclosure.

FIG. 1 is a block diagram that illustrates an example of a system 100 for hybrid schemes of mode decision according to an embodiment of the disclosure. System 100 may include, among other things, BS 110 communicably coupled on respective communication channels (not shown) to MS 106*a*, MS 106*b*, . . . , MS 106*n* (hereinafter "MS 106" for convenience) via network 102. BS 110 may make a mode decision for each respective communication channel based on the system state of each channel and may transmit communications using a selected mode. The mode decision may include a selection of a mode configuration that may include, among other things, a MIMO mode, a MCS level, MIMO mode feedback interval, and/or other configurations as appropriate.

MS 106 may associate various channel information with the communication channel. Based upon the channel information, MS 106 may make a mode recommendation. In other words, MS 106 may determine a mode configuration that MS 106 determines is appropriate in light of the channel information. MS 106 may include at least a portion of the channel information and the mode recommendation into Feedback 103*a*, Feedback 103*b*, . . . , Feedback 103*n* (hereinafter "Feedback 103" for convenience) and may transmit Feedback 103 to BS 110.

BS 110 may receive Feedback 103 from MS 106. As previously noted, Feedback 103 may include channel information related to the communication channel such as, for example, BuER via an ACK/NACK ratio, which indicates a ratio of successful transmissions and non-successful transmissions. According to various embodiments of the disclosure, BS 110 may make a mode decision based upon Feedback 103 and/or other information (such as system level information). For example, BS 110 may decide to use the mode recommendation from MS 106. Alternatively, BS 110 may decide to use a mode configuration determined on its own based on information available to BS 110 such as Feedback 103 and/or system level information. As such, BS 110 may use a hybrid scheme of mode decision, by using either a MS-centric approach that uses a MS recommended mode configuration or by using a BS-centric approach that uses a BS determined mode configuration.

Figure 2:
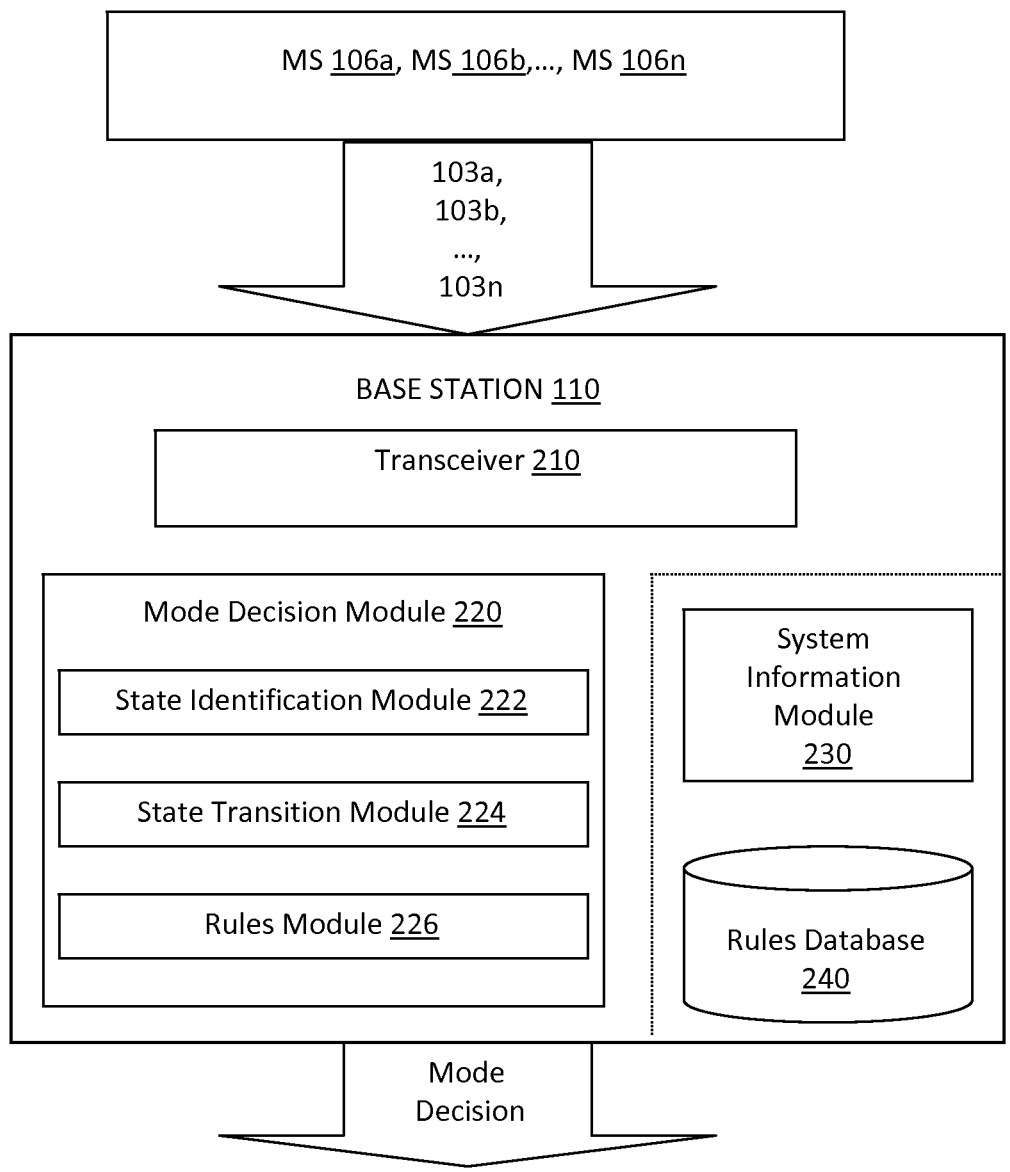
FIG. 2 is a block diagram that illustrates an example of a base station that is communicably coupled to a mobile station and that implements hybrid schemes of mode decision according to an embodiment of the disclosure.

FIG. 2 is a block diagram that illustrates an example BS 110 that is communicably coupled to MS 106 and that implements hybrid schemes of mode decision according to an embodiment of the disclosure. BS 110 may include, among other things, transceiver 210, mode decision module 220, system information module 230, and rule database 240.

Transceiver 210 may transmit to and receive communications from MS 106 on one or more communication channels. For example, transceiver 210 may receive Feedback 103 from MS 106 and transmit to MS 106 various communications on the one or more communication channels using a mode configuration.

According to various embodiments of the disclosure, through various modules, mode decision module 220 may employ hybrid schemes of mode decision. For example, mode decision module 220 may include, among other things, state identification module 222, state transition module 224, and rules module 226. By employing hybrid schemes of mode decision, mode decision module 220 may take advantage of the benefits of using an MS-derived mode configuration and the benefits of using a BS-derived mode configuration by deciding between the mode configurations depending on the system state.

According to various embodiments of the disclosure, state identification module 222 may identify a system state using various state information such as, for example, channel information from Feedback 103, system level information provided by system information module 230, and/or combination of channel information and system level information. For example, state identification module 222 may determine a system state by considering state information alone, such as Corr alone, or considering state information in combination with other state information, such as (1) Corr and PCINR; (2) Corr and BuER; and/or (3) BuER and PCINR, (4) Cor, PCINR and BuER. Other state information used alone and/or in combination are contemplated. For example, whether and how state information is to be considered alone or in combination with other state information when determining the system state may be configurable by a vendor (or other entity) implementing the system or method, thereby providing the vendor with flexibility to configure identification of the system state according to particular needs. In this manner, even when one or more state information is unavailable, the vendor may use state identification module 222 to determine the system state as disclosed herein. These and other configurations may be stored as one or more state information rules in rule database 240 and may be managed (e.g., created, retrieved, deleted, updated, etc.) by rules module 226.

According to various embodiments of the disclosure, when determining the system state, state identification module 222 may apply various correlation rules, which may be stored in rule database 240 and may be managed by rule module 226. The correlation rules may correlate values of the state information that indicate different system states. In other words, the correlation rules may indicate a level of state information (or combinations of state information) at which a particular system state is defined. For example, a correlation rule may define that a Corr value of less than 0.5 indicates a particular system state, while another correlation rule may define that a Corr value of greater than 0.5 indicates another system state. In another example, a correlation rule may define that a BuER value of less than 10% combined with a PCINR value of greater than 20 dB indicates a system state while another correlation rule may define that a BuER value of greater than 10% combined with a PCINR value of less than 20 dB indicates another system state. The correlation rules may be configured by the vendor, thereby providing flexibility to the vendor to define various system states according to particular needs while also providing a hybrid scheme of mode decision. It should be understood that the foregoing correlation rules and values are examples only and should not be viewed as limiting in any way.

According to various embodiments of the disclosure, state identification module 222 may associate a system state with a BS-centric approach or a MS-centric approach. The BS-centric approach may use a BS-derived mode configuration while the MS-centric approach may use a MS-derived mode configuration. In other words, mode decision module 220 may use the BS-derived mode configuration or use the MS-derived mode configuration based on the determined system state. Thus, depending on the identified system state, mode decision module 220 may employ a BS-centric or MS-centric approach for mode decision. As such, mode decision module 220 may adapt the mode decision over time according to changing conditions of the communication channel between BS 110 and MS 106, for example.

According to various embodiments of the disclosure, mode decision module 220 may transition one system state to another system state in association with or otherwise using functions provided by state transition module 224. For example, when a prior system state has been determined for a prior communication, state transition module 224 may retrieve or otherwise use the prior system state and prior state information used to identify the prior system state. The prior state information may be compared to current state information in order to transition the system state from the prior system state to a current system state. The current system state may then be used to make a mode decision as described above.

According to various embodiments of the disclosure, transition from one system state to another system state may be controlled by a transition condition. A particular system state may be associated with or otherwise defined by one or more transition conditions. For example, if the particular system state may be transitioned to one of three other system states, the particular system state may be associated with three transition conditions. A transition condition may include one or more transition rules. A transition rule may define when one system state is to be transitioned to another system state. Transition conditions and their transition rules may be predefined by the vendor, may be managed by rule module 226, and may be stored in rule database 240. As such, transition conditions may be expressed as configuration parameters by which to transition one system state to another system state. Thus, for a given system state, one or more transition conditions may define whether and how the system state is to be transitioned to another system state.

In particular, a parameter by which a transition rule may specify a transition from one system state to another system state may include, among other parameters, a particular difference threshold that when exceeded (or not exceeded) by a difference between prior state information and current state information, a transition is specified. More particularly, a transition rule may specify that one system state be transitioned to another system state when a difference between a prior Corr value and a current Corr value, for example, exceeds or is below a particular difference threshold. Thus, based on changed channel and/or system level information, a system state transition may occur. As previously noted, transition conditions may be predefined by the vendor. Accordingly, the difference threshold may be predefined by the vendor to suit particular needs. For example, if Corr at a prior time point (Corr(t)) is 0.1 and Corr at a current time point (Corr(t+1)) is 0.5, then the Corr value at the current time point may be deemed higher while a difference between Corr(t+1) and Corr(t) less than 0.1 may be deemed similar by the vendor. The preceding values are example values that may be configured by the vendor (or other entity) and should not be viewed as limiting in any way.

According to various embodiments of the disclosure, the particular manner in which a transition rule is defined may vary. In the preceding example, the transition rule may specify that a transition from one state to another state occurs when the Corr value is greater than a prior Corr value (e.g., the current Corr is greater than a prior Corr). Alternatively or additionally, the transition rule may specify particular values by which the Corr value may be greater or lesser in order to transition to another state (i.e., a difference between a prior Corr value and a current Corr value by a certain amount will cause a state transition).

According to various embodiments, a transition condition may include a combination of two or more transition rules. For example, a transition condition may include two transition rules, one of which may specify that a system state be transitioned to another system state when a current PCINR value is higher than a prior PCINR value while another transition rule may specify that the system state be transitioned to the other system state when a current ACK/NACK ratio is lower than a prior ACK/NACK ratio. Alternatively or additionally, a transition condition may include a single transition rule that may define comparisons of combinations of state information. For example, the single transition rule may specify that one system state be transitioned to another system state when a current PCINR value is higher than a prior PCINR value and when a current ACK/NACK ratio is lower than a prior ACK/NACK ratio.

According to an embodiment, a transition condition may group transition rules by precedence. Such precedential grouping may be illustrated by the following examples:
  Case 1: transition rule A or transition rule C.
  Case 2: transition rule A+transition rule B.
  Case 3: transition rule D or (transition rule E+transition rule F)).

In the above example transition condition cases, Case 1 may indicate that transition rule A or transition rule C may be satisfied in order to transition from one system state to another system state. Case 2 may indicate that transition rule A and transition rule B are both to be satisfied in order to transition from one system state to another system state. Case 3 may indicate that transition rule D and one of transition rule E or transition rule F is to be satisfied in order to transition from one system state to another system state. As a particular example, a precedential grouping of transition rules may define that one system state be transitioned to another system state when (i) Corr is lower or (ii) when both PCINR is higher and ACK/NACK ratio is similar. Various other combinations of groupings are contemplated.

In operation, when a mode decision is to be performed, state transition module 224 may retrieve a prior system state, prior state information that resulted in the prior system state, and a transition condition associated with the prior state. State transition module 224 may compare current state information with prior state information using the transition rules of the transition condition. When the transition rules have been satisfied, state transition module 224 may transition the prior system state to a current system state, thereby identifying a system state for the mode decision. According to an embodiment, by doing so, state transition module 224 may facilitate a hybrid scheme of mode decision by transitioning the system state according to various transition conditions that may be responsive to changes to state information.

It should be noted that state transition module 224 may operate in addition to or instead of state identification module 222. In other words, state identification module 222 may identify a system state independently of state transition module 224 or may use state transition module 224 to identify the current system state. Furthermore, state transition module 224 may independently identify the current state based on a prior state without using state identification module 222 (for the initial system state a default system state, for example, may be used).

Figure 3:
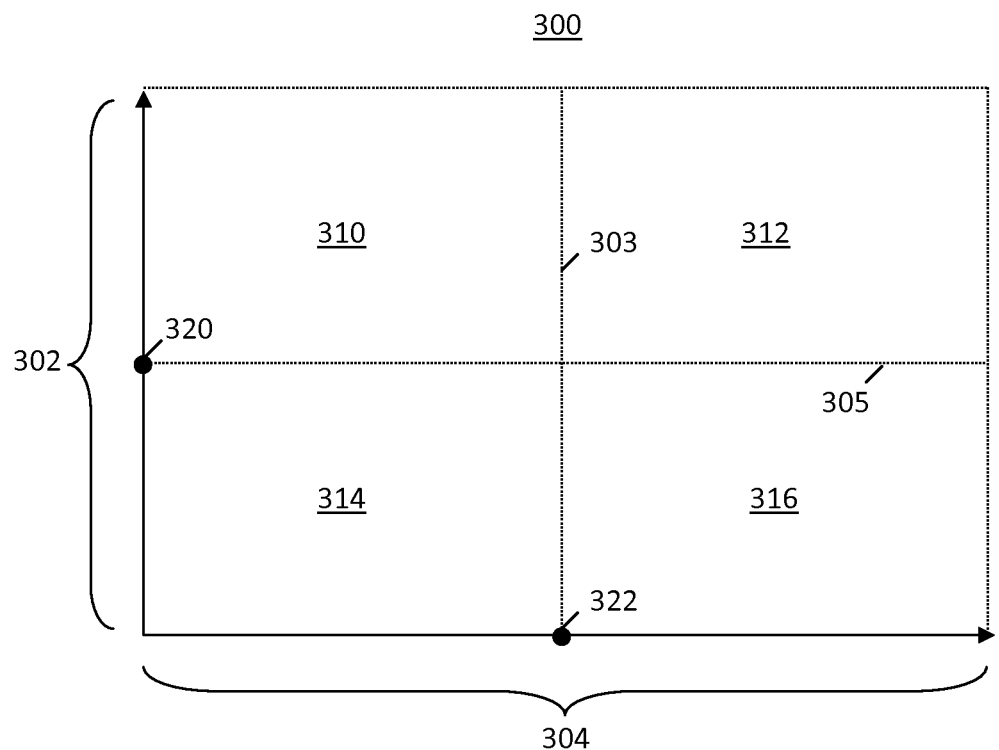
FIG. 3 is a two-dimensional graph illustrating four example system states according to an embodiment of the disclosure.

FIG. 3 is a two-dimensional graph 300 illustrating four example system states 310, 312, 314, and 316 according to an embodiment of the disclosure. In graph 300, state information 302 (such as, for example, BuER or any other state information that is different from state information 304. Hereinafter state information 302 will be referred to as "BuER 302" for convenience.) is graphed as a function of another state information 304 (such as, for example, PCINR or any other state information that is different from state information 302. Hereinafter state information 302 will be referred to as "PCINR 304" for convenience). It should be understood that in FIG. 3 and any other figures illustrating a two-dimensional graph herein, the graphs are illustrative only and should not be viewed as limiting. For example, the axes may be reversed as appropriate without departing from the scope of this disclosure and the particular values are non-limiting examples.

Point 320 illustrates an example value of BuER 302 by which states 310 and 312 may be separated from 314 and 316 along line 305. Point 322 illustrates an example value of PCINR 304 by which system states 310 and 314 are separated from system states 312 and 316 alone line 303. In other words, dotted lines 303 and 305 respectively represent values of PCINR 304 and BuER 302 and PCINR that may define interfaces between system states 310, 312, 314, and 316. For example, according to graph 300, system states 310, 312, 314, and 316 may be characterized by the following:
  System state 310 may be characterized by a BuER value that is greater than the value of BuER indicated by dotted line 305 and less than the PCINR value indicated by dotted line 303.
  System state 312 may be characterized by a BuER value that is greater than the value of BuER indicated by dotted line 305 and greater than the PCINR value indicated by dotted line 303.
  System state 314 may be characterized by a BuER value that is less than the value of BuER indicated by dotted line 305 and less than the PCINR value indicated by dotted line 303.
  System state 316 may be characterized by a BuER value that is less than the value of BuER indicated by dotted line 305 and greater than the PCINR value indicated by dotted line 303.

Thus, according to the example in graph 300, depending on particular combinations of BuER 302 and PCINR 304, a particular system state may be identified as one of system states 310, 312, 314, and 316.

According to various embodiments of the disclosure, each system state 312, 314, 316, and 318 may be associated with a mode decision. Thus, current values of BuER and PCINR that are used to identify a system state, for example, may be used by mode decision module 220 to determine the mode decision. For example, system states 310 and 316 may be associated with a BS-centric mode decision, thereby using a BS-derived mode configuration. In a particular embodiment, the mode configuration derived by BS 110 for system state 310 may include a selection of MIMO Mode A and low MCS while the mode configuration derived by BS 110 for system state 316 may include a selection of MIMO Mode B and high MCS. On the other hand, system states 312 and 314 may be associated with a MS-centric mode decision, thereby using a MS-derived mode configuration (i.e., the mode recommendation by MS 106). In a particular embodiment, the mode configuration derived by MS 106 for system state 312 may include a selection of MIMO Mode B and low MCS while the mode configuration derived by MS 106 for system state 314 may include a selection of MIMO Mode A and high MCS. Thus, according to a particular embodiment, a transition from system state 310 to system state 312 may result in a mode decision that adapts from the BS-derived mode configuration MIMO mode A and low MCS to a MS-derived mode configuration MIMO mode B and low MCS.

By adapting the mode decision according to the system state, a hybrid scheme of mode decision may be achieved, thereby adaptively responding to the system state with an appropriate mode configuration.

It should be noted that although dotted line 303 separating system states 310 and 312 from system states 314 and 316 is drawn as a horizontal line that is perpendicular to the axis indicating BuER 302, dotted line 303 may be any other shape or form (such as, for example, intersecting the axis indicating BuER 302 at an angle and/or having a curvilinear shape). The same may apply to dotted line 305 separating system states 310 and 314 from states 312 and 316. As such, dotted lines 303 and 305 may separate system states 310, 312, 314, and 316 based on different values of BuER and PCINR, for example. Furthermore, as previously noted, more than two state information may be combined when determining a system state. Thus, graph 300 may be illustrated as a multi-dimensional (i.e., more than two-dimensional) graph when more than two state information are combined (or a one-dimensional graph when one state information is used to determine a system state). It is further noted that although four system states are illustrated by graph 300, more than four system states may exist as appropriate. The precise number of system states may be configured by the vendor according to the transition rules, for example, discussed above. As such, it should be understood that FIG. 3a is an example only and is used to simplistically illustrate various system states characterized by a combination of state information.

Figure 4:
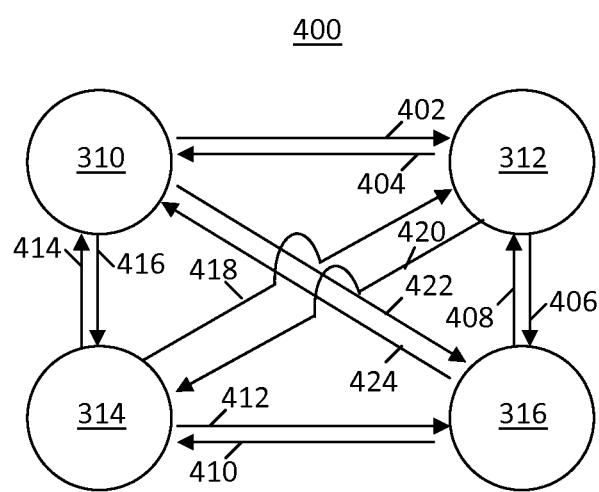
FIG. 4 is a two-dimensional state transition graph illustrating various transitions between four example system states according to an embodiment of the disclosure.

FIG. 4 is a two-dimensional state transition graph 400 illustrating various transition conditions 402, 404, 406, 408, 410, 412, 414, 416, 418, 420, 422, and 424 (when referred to collectively herein, "transition conditions (402, 404, . . . , 424)") between four example system states 310, 312, 314, and 316 according to an embodiment of the disclosure. As previously noted, transition conditions (402, 404, . . . , 424) may each include one or more transition rules, used alone or in combination with one another, that specify whether and how to transition from one system state to another system state. In the examples illustrated in graph 400, system state 310, for example, may be transitioned to one of states 312, 314, and 316 according to transition conditions 402, 416, and 422, respectively. Furthermore, system states 312, 314, and 316 may each be transitioned to system state 310 according to transition conditions 404, 416, and 424, respectively. Example transition conditions (402, 404, . . . , 424) are described in Table 1 below.

TABLE 1

| Transition Condition | Transition Rule | | Centric |
|---|---|---|---|
| 402 | Corr: | lower | MS |
| | PCINR: | higher | |
| | BuER: | similar | |
| 404 | Corr: | higher | BS |
| | PCINR: | lower | |
| | BuER: | similar | |

TABLE 1-continued

| Transition Condition | Transition Rule | | Centric |
|---|---|---|---|
| 406 | Corr: | similar | BS |
| | PCINR: | higher | |
| | BuER: | lower | |
| 408 | Corr: | similar | MS |
| | PCINR: | lower | |
| | BuER: | higher | |
| 410 | Corr: | higher | MS |
| | PCINR: | lower | |
| | BuER: | similar | |
| 412 | Corr: | lower | BS |
| | PCINR: | higher | |
| | BuER: | similar | |
| 414 | Corr: | similar | BS |
| | PCINR: | lower | |
| | BuER: | higher | |
| 416 | Corr: | similar | MS |
| | PCINR: | higher | |
| | BuER: | lower | |
| 418 | Corr: | lower | MS |
| | PCINR: | similar | |
| | BuER: | similar | |
| 420 | Corr: | higher | MS |
| | PCINR: | similar | |
| | BuER: | similar | |
| 422 | Corr: | lower | BS |
| | PCINR: | similar or higher | |
| | BuER: | lower | |
| 424 | Corr: | higher | BS |
| | PCINR: | similar or lower | |
| | BuER: | higher | |

Referring to Table 1, the "Transition Rule" column illustrates a combination of transition rules for each of the example transition conditions (402, 404, . . . , 424) (or alternatively, a single transition rule that includes a combination of state information). The combination of transition rules each specify parameters by which example state information Corr, PCINR, and BuER determine a state transition for the corresponding transition condition. For example, transition condition 402, which according to FIG. 4 specifies a transition from system state 310 to system state 312, may include transition rules that specify whether and how system state 310 is to be transitioned to system state 312. In this example, if a current Corr value is lower than the Corr value that was considered when determining system state 310, then the Corr transition rule may be satisfied. If a current PCINR value is higher than the PCINR value that was considered when determining system state 310, then the PCINR transition rule may be satisfied. If a current BuER is similar to the BuER value that was considered when determining system state 310, then the BuER transition rule may be satisfied.

If all transition rules are to be satisfied in order transition from system state 310 to system state 312 and all transition rules have been satisfied, then state transition module 224 may transition the system state from system state 310 to system state 312, thereby shifting from a MS-centric mode decision to a BS-centric mode decision in this example.

It should be noted that "lower," "higher," and "similar," may be predefined by the vendor in order to enable the vendor to configure each. In other words, the vendor may specify to what extent a data from prior state information is "lower," "higher," or "similar" to data from current state information in order to satisfy a corresponding transition rule. Furthermore, each state information may be configured differently with regard to "lower," "higher," or "similar." For example, a value that may be considered "lower" when comparing Corr may not be "lower" when comparing PCINR values. In a particular non-limiting example, at a prior time point t, a Corr(t) value of 0.6, a PCINR(t) value of 10 dB, and a BuER(t) of 20% may result in a MIMO mode A decision. At a current (or later) time point t+1, a Corr(t+1) value of 0.1, PCINR(t+1) value of 25 dB, and BuER(t+1) of 10% may result in a transition to a state that results in a MIMO mode B decision.

It should also be understood that while four system states 310, 312, 314, and 316 are illustrated in graph 400, any number of system states may be used according to particular needs without departing from the scope of this disclosure.

Figure 5:
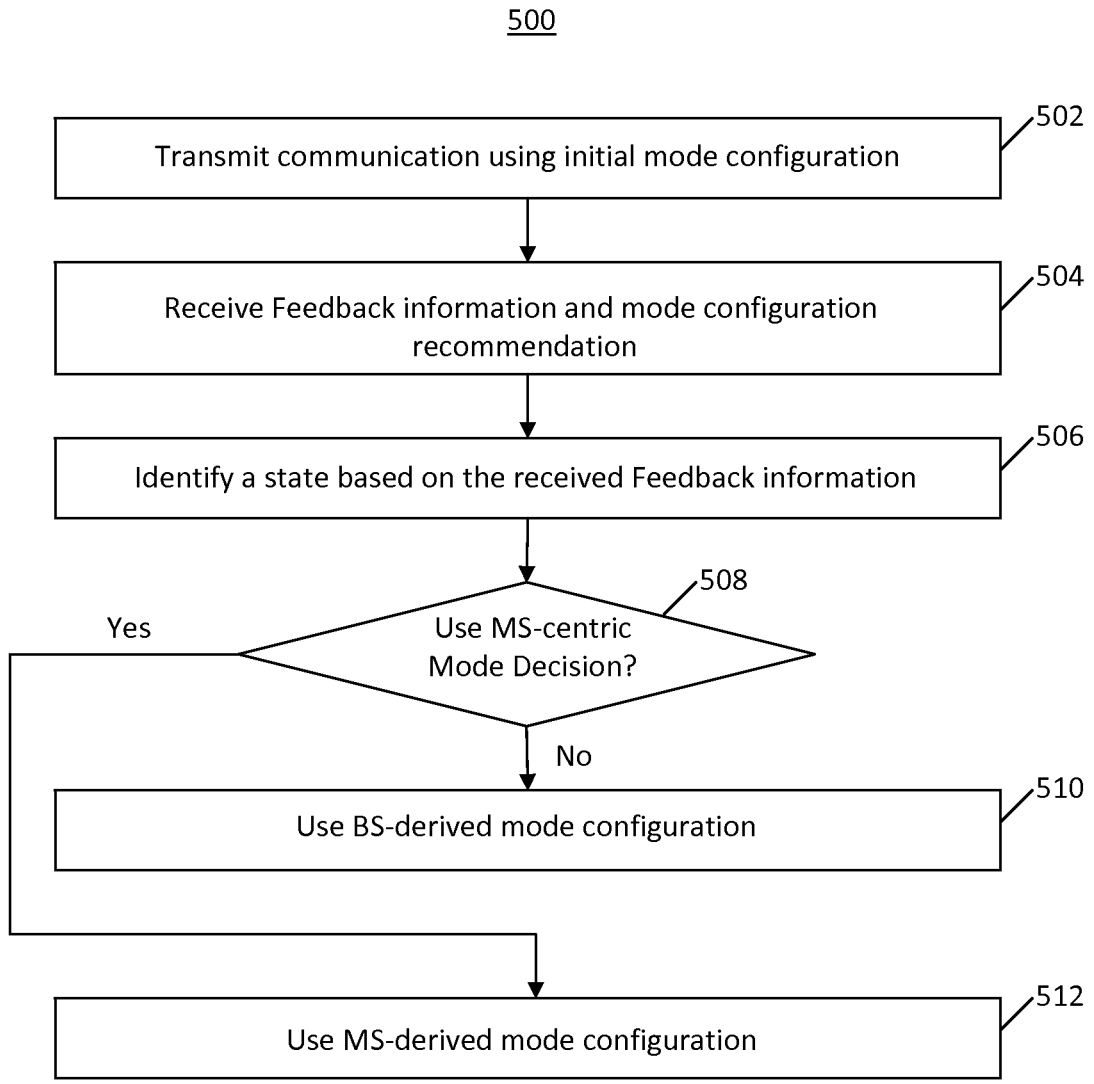
FIG. 5 is a flow diagram illustrating an example process for implementing hybrid schemes of mode decision according to an embodiment of the disclosure.

FIG. 5 is a flow diagram illustrating an exemplary process 500 for implementing hybrid schemes of mode decision according to an embodiment of the disclosure. The various processing operations depicted in the flow diagram of FIG. 5 (and in the other drawing figures) are described in greater detail herein. The described operations for a flow diagram may be accomplished using some or all of the system components described in detail above and, in some embodiments, various operations may be performed in different sequences. In other embodiments, additional operations may be performed along with some or all of the operations shown in the depicted flow diagrams. In yet other embodiments, one or more operations may be performed simultaneously. Accordingly, the operations as illustrated (and described in greater detail below) are examples by nature and, as such, should not be viewed as limiting.

According to various embodiments of the disclosure, in an operation 502, a communication may be transmitted using an initial mode communication (such as, for example, a default mode configuration or a mode configuration selected by BS 110). In an operation 504, Feedback 103 may be received, which may include a mode recommendation from MS 106. MS 106 may generate the mode recommendation based on channel information for which MS 106 has access such as, for example, Corr, PCINR, and/or BuER. Corr may indicate path correlation between multiple receivers (such as multiple MSs) such that a higher Corr may indicate higher error rates of data transmission. PCINR may indicate a level of interference on the communication channel and BuER may indicate transmission error rates via ACK/NACK feedback. Because MS 106 may have more channel information than BS 110, MS 106 may be better suited than BS 110 select a mode configuration. However, because MS 106 does not have access to information such as, for example, system-level information, for which BS 110 has access, MS 106 may not take into account such information. Thus, in certain situations (i.e., depending on the system state) MS 106 may make a better mode decision than BS 110, and vice versa.

As such, in order to adaptively determine which mode to use, a system state may be identified based at least in part on Feedback 103 and/or system level information in an operation 506. The system state may be characterized by factors such as, for example, channel information of the communication channel and/or the system level information that may indicate an ability of the system to process communications. As such, the system state may reflect current conditions that may affect communications between BS 110 and MS 106. Therefore, the system state may be used to determine whether an MS-centric approach or a BS-centric approach should be used. When using the MS-centric approach, the mode recommendation from MS 106 may be used. On the other hand, when using the BS-centric approach, a mode configuration generated by BS 110 may be used.

The system state may be identified using various state information such as, for example, channel information from Feedback 103, system level information, and/or combination of channel information and system level information. For example, state identification module 222 may determine a system state by considering state information alone, such as Corr alone, or considering state information in combination with other state information, such as (1) Corr and PCINR; (2) Corr and BuER; and/or (3) BuER and PCINR. Other state information used alone and/or in combination are contemplated. For example, whether and how state information is to be considered alone or in combination with other state information when determining the system state may be configurable by a vendor (or other entity) implementing the system or method, thereby providing the vendor with flexibility to configure identification of the system state according to particular needs. In this manner, even when one or more state information is unavailable, the system state still may be determined. These and other configurations may be stored as one or more state information rules in rule database 240. Thus, information for system state determination may be retrieved.

In an operation 508, a determination may be made whether to use a MS-centric or BS-centric mode decision based on the identified system state. If in operation 508 the BS-centric mode is determined to be used, then a mode configuration generated by BS 110 may be used to configure the mode in an operation 510. If in operation 508 the MS-centric mode is determined to be used, then the mode recommendation from MS 106 may be used to configure the mode in an operation 512.

Figure 6:
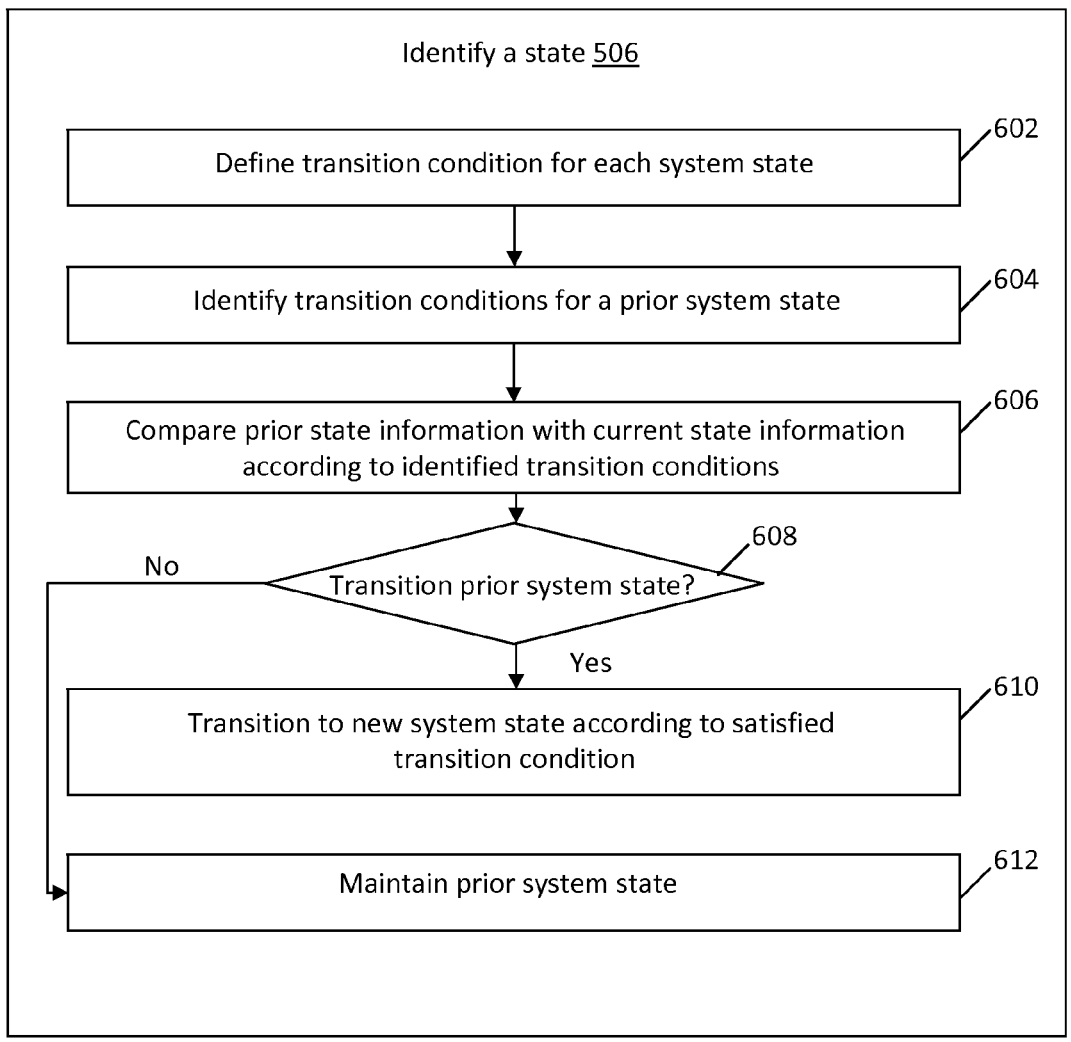
FIG. 6 is a flow diagram illustrating an example process for determining a system state via state transitions according to an embodiment of the disclosure.

FIG. 6 is a flow diagram illustrating an example process 506 for determining a system state via state transitions according to an embodiment of the disclosure. In an operation 602, a transition condition may be defined for each of a plurality of system states. A particular system state may be associated with one or more transition conditions. For example, if the particular system state may be transitioned to one of three other system states, the particular system state may be associated with three transition conditions. The transition condition may include one or more transition rules. A transition rule may define when one system state is to be transitioned to another system state. Transition conditions may be predefined by the vendor and may be stored (along with their transition rules) in rule database 240, for example.

In an operation 604, transition condition(s) may be identified for a prior system state. The identified transition conditions may be retrieved from, for example, rule database 240. In an operation 606, the transition rule(s) of each of the identified transition condition(s) may be applied to prior state information and current state information to determine whether and how to transition from the prior system state to a current system state. In an operation 608, a determination may be made whether any of the identified transition condition(s) for the prior system state has been satisfied. If in operation 608, no transition condition among the identified transition condition(s) is satisfied (thereby indicating that the prior system state has changed), then in an operation 610 a new system state is transitioned according to the satisfied transition condition and a new mode configuration may be selected accordingly. If in operation 608, a transition condition among the identified transition condition(s) is not satisfied (thereby indicating that the system state has not changed since the prior system state), then in an operation 612 the prior system state is not transitioned and the prior mode configuration may be used again.

Examples of MS 106 may include any one or more of, for instance, a personal computer, portable computer, personal digital assistant (PDA), workstation, web-enabled mobile phone, WAP device, web-to-voice device, or other device. Those having skill in the art will appreciate that the embodiments described herein may work with various system configurations.

In addition, various embodiments of the disclosure may be made in hardware, firmware, software, or any suitable combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific example embodiments of the disclosure, and performing certain actions. However, it will be apparent that such descriptions are merely for convenience and that such actions in fact result from computing devices, processors, controllers, or other devices executing the firmware, software, routines, or instructions.

Various embodiments described herein are describe as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to the provided description without departing from the scope or spirit of the disclosure.

For example, although illustrated as part of BS 110, rules database 240 may be separate from BS 110 as a standalone database. Furthermore, rules database 240 may be maintained by the vendor or other entity without departing from the scope of this disclosure. It should be noted that rules database 240 may be relational database, a database of configuration or other files, and/or other storage technique known in the art. System information module 230 may likewise be part of BS 110 or separate from BS 110. Furthermore, transceiver 210 may be a separate receiver and transmitter (not shown) without departing from the scope of this disclosure.

Other embodiments, uses and features of the present disclosure will be apparent to those skilled in the art from consideration of the specification and practice of the inventive concepts disclosed herein. The specification and drawings should be considered exemplary only, and the scope of the disclosure is accordingly intended to be limited only by the following claims.

What is claimed is:

1. A system for a hybrid scheme of mode decision in a network having a plurality of mobile stations (MS) communicably coupled to a base station (BS), the system comprising:
 a mode decision module associated with the BS, the mode decision module comprising one or more processors configured to:
  select a first mode configuration for use during transmission of a first communication from the base station; and
  receive first feedback information comprising a first mode recommendation and first channel information from at least one of the plurality of mobile stations;
 wherein the mode decision module includes:
  a state identification sub-module comprising one or more processors to identity a first system state of the first communication based at least in part on the first channel information; and
  a state transition sub-module comprising one or more processors to determine whether to transition from a prior system state to the first system state based on one or more transition conditions, and transition from the prior system state to the first system state,
 wherein the one or more processors of the mode decision module are further configured to:
  determine whether to use the first mode recommendation based at least in part on the first system state and satisfaction of at least one of the one or more transition conditions; and
  responsive to the determination, configure a second communication using a second mode configuration selected between a BS-derived mode based upon system-level information and an MS-mode recommendation based upon channel information so as to adaptively change the system state as channel condition or network condition change over time.

2. The system of claim 1, wherein the first mode configuration comprises one or more of: a Multiple-Input-Multiple-Output (MIMO) Mode or a Modulation Coding Scheme (MCS) level.

3. The system of claim 1, wherein the one or more processors of the mode decision module are further configured to:
 determine that the first mode recommendation is to be used; and
 select the MS-mode recommendation to be used for the second mode configuration, wherein the first mode recommendation is same as the MS-mode recommendation.

4. The system of claim 1, wherein the one or more processors of the mode decision module are further configured to:
 determine that the first mode recommendation is not to be used; and
 select the BS-derived mode configuration to be used for the second mode configuration.

5. The system of claim 1, wherein the first channel information comprises at least two factors that are used to identify the first system state.

6. The system of claim 5, wherein the at least two factors comprise a combination of at least two of: a Physical Carrier to Interference and Noise Ratio (PCINR), a Burst Error Rate (BuER), or a channel correlation (Corr).

7. The system of claim 1, wherein the first channel information comprises a single factor that is used to identify the first system state.

8. The system of claim 7, wherein the single factor is a channel correlation (Corr).

9. The system of claim 1, wherein the one or more processors of the mode decision module are further configured to:
 receive second feedback information comprising a second mode recommendation and second channel information;
 identity a second system state of the second communication based at least in part on the second channel information;
 determine whether to use the second mode recommendation for a third communication based at least in part on the second system state; and
 configure the third communication using a third mode configuration based on the determination whether to use the second mode recommendation.

10. The system of claim 1, wherein the state transition module comprising one or more processors is further configured to:
 identity the one or more transition conditions corresponding to the prior system state for a prior communication before the first communication, wherein the one or more transition conditions comprise at least one transition rule that defines whether to transition the prior system state to the first system state.

11. The system of claim 10, the one or more processors of the state transition module further configured to use the at least one transition rule to compare a prior channel information with the first channel information to determine whether the prior system state is to be transitioned to the first system state.

12. The system of claim 1, wherein the network is a WIMAX network.

13. A base station for a hybrid scheme of mode decision in a network having a plurality of mobile stations (MS) communicably coupled to the base station (BS), the base station comprising:
  a mode decision module associated with the BS, the mode decision module comprising one or more processors configured to:
    select a first mode configuration for use during transmission of a first communication from the BS; and
    receive first feedback information comprising a first mode recommendation and first channel information from at least one of the plurality of MS;
  wherein the mode decision module includes:
    a state identification sub-module comprising one or more processors to identity a first system state of the first communication based at least in part on the first channel information; and
    a state transition sub-module comprising one or more processors to determine whether to transition from a prior system state to the first system state based on one or more transition conditions, and transition from the prior system state to the first system state,
  wherein the one or more processors of the mode decision module are further configured to:
    determine whether to use the first mode recommendation based at least in part on the first system state and satisfaction of at least one of the one or more transition conditions; and
    responsive to the determination, configure a second communication using a second mode configuration selected between a BS-derived mode based upon system-level information and an MS-mode recommendation based upon channel information so as to adaptively change the system state as channel condition or network condition change over time.

14. A mode decision device for a hybrid scheme of mode decision in a network having a plurality of mobile stations (MS) communicably coupled to a base station (BS), the mode decision device comprising:
  one or more processors configured to:
    select a first mode configuration for use during transmission of a first communication from the BS; and
    receive first feedback information comprising a first mode recommendation and first channel information from at least one of the plurality of MS;
  a state identification sub-module comprising one or more processors to identity a first system state of the first communication based at least in part on the first channel information; and
  a state transition sub-module comprising one or more processors to determine whether to transition from a prior system state to the first system state based on one or more transition conditions, and transition from the prior system state to the first system state,
  wherein the one or more processors of the mode decision device are further configured to:
    determine whether to use the first mode recommendation based at least in part on the first system state and satisfaction of at least one of the one or more transition conditions; and
    responsive to the determination, configure a second communication using a second mode configuration selected between a BS-derived mode based upon system-level information and an MS-mode recommendation based upon channel information so as to adaptively change the system state as channel condition or network condition change over time.

15. A computer-implemented method for a hybrid scheme of mode decision in a network having a plurality of mobile stations (MS) communicably coupled to a base station (BS), the method comprising:
  selecting, by the base station, a first mode configuration for use during transmission of a first communication from the base station;
  receiving, by the base station, first feedback information comprising a first mode recommendation and first channel information from at least one of the plurality of MS;
  identifying, by the base station, a first system state of the first communication based at least in part on the first channel information;
  determining, by the base station, whether to transition from a prior system state to the first system state based on one or more transition conditions, and transitioning from the prior system state to the first system state;
  determining, by the base station, whether to use the first mode recommendation based at least in part on the first system state and satisfaction of at least one of the one or more transition conditions; and
  responsive to the determination, configuring, by the base station, a second communication using a second mode configuration selected between a BS-derived mode based upon system-level information and an MS-mode recommendation based upon channel information so as to adaptively change the system state as channel condition or network condition change over time.

16. The computer-implemented method of claim 15, wherein the first mode configuration comprises one or more of: a Multiple-Input-Multiple-Output (MIMO) Mode or a Modulation Coding Scheme (MCS) level.

17. The computer-implemented method of claim 15, the method further comprising:
  determining, by the base station, that the first mode recommendation is to be used; and
  selecting the MS-mode recommendation to be used for the second mode configuration, wherein the first mode recommendation is same as the MS-mode recommendation.

18. The computer-implemented method of claim 15, the method further comprising
  determining, by the base station, that the first mode recommendation is not to be used; and
  selecting, by the base station, the BS-derived mode configuration to be used for the second mode configuration.

19. The computer-implemented method of claim 15, wherein the first channel information comprises at least two factors that are used to identify the first system state.

20. The computer-implemented method of claim 19, wherein the at least two factors comprise a combination of at least two of: a Physical Carrier to Interference and Noise Ratio (PCINR), a Burst Error Rate (BuER), or a channel correlation (Corr).

21. The computer-implemented method of claim 15, wherein the first channel information comprises a single factor that is used to identify the first system state.

22. The computer-implemented method of claim 21, wherein the single factor is a channel correlation (Corr).

23. The computer-implemented method of claim 15, the method further comprising:
receiving, by the base station, second feedback information comprising a second mode recommendation and second channel information;
identifying, by the base station, a second system state of the second communication based at least in part on the second channel information;
determining, by the base station, whether to use the second mode recommendation for a third communication based at least in part on the second system state; and
configuring, by the base station, the third communication using a third mode configuration based on the determination whether to use the second mode recommendation.

24. The computer-implemented method of claim 15, the method further comprising:
identifying, by one or more processors of a state transition module of the base station, the one or more transition conditions corresponding to the prior system state for a prior communication before the first communication, wherein the one or more transition conditions comprise at least one transition rule that defines whether to transition from the prior system state to the first system state.

25. The computer-implemented method of claim 15, the method further comprising:
using, by the one or more processors of the state transition module, the at least one transition rule to compare a prior channel information with the first channel information to determine whether the prior system state is to be transitioned to the first system state.

26. The computer-implemented method of claim 15, wherein the network is a WIMAX network.

27. A non-transitory computer readable medium storing computer executable instructions for a hybrid scheme of mode decision in a network having a plurality of mobile stations (MS) communicably coupled to a base station (BS), the instructions, when executed, configuring one or more processors to perform the operations of:
selecting, by the base station, a first mode configuration for use during transmission of a first communication from the base station;
receiving, by the base station, first feedback information comprising a first mode recommendation and first channel information from at least one of the plurality of MS;
identifying, by the base station, a first system state of the first communication based at least in part on the first channel information;
determining, by the base station, whether to transition from a prior system state to the first system state based on one or more transition conditions, and transitioning from the prior system state to the first system state;
determining, by the base station, whether to use the first mode recommendation based at least in part on the first system state and satisfaction of at least one of the one or more transition conditions; and
responsive to the determination, configuring, by the base station, a second communication using a second mode configuration selected between a BS-derived mode based upon system-level information and an MS-mode recommendation based upon channel information so as to adaptively change the system state as channel condition or network condition change over time.

* * * * *